United States Patent
Attridge et al.

(10) Patent No.: US 10,519,869 B2
(45) Date of Patent: Dec. 31, 2019

(54) ELECTRICAL AND MECHANICAL CONNECTIONS THROUGH FIREWALL

(71) Applicant: United Technologies Corporation, Farmington, CT (US)

(72) Inventors: Paul Attridge, Colchester, CT (US); Gabriel L. Suciu, Glastonbury, CT (US); Kurt J. Sobanski, Glastonbury, CT (US); Jesse M. Chandler, South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 708 days.

(21) Appl. No.: 15/137,614

(22) Filed: Apr. 25, 2016

(65) Prior Publication Data

US 2017/0306852 A1 Oct. 26, 2017

(51) Int. Cl.
| | |
|---|---|
| *F02C 7/32* | (2006.01) |
| *F02C 7/20* | (2006.01) |
| *B64C 27/64* | (2006.01) |
| *B64C 27/625* | (2006.01) |
| *F02C 7/36* | (2006.01) |

(Continued)

(52) U.S. Cl.
CPC ............. *F02C 7/32* (2013.01); *B64C 27/625* (2013.01); *B64C 27/64* (2013.01); *B64C 27/68* (2013.01); *B64C 33/00* (2013.01); *F02C 3/04* (2013.01); *F02C 7/20* (2013.01); *F02C 7/25* (2013.01); *F02C 7/36* (2013.01); *F02K 3/06* (2013.01); *H02K 7/003* (2013.01); *H02K 11/20* (2016.01);

(Continued)

(58) Field of Classification Search
CPC ...... F02C 7/25; F02C 7/32; F02C 3/04; F02C 7/36; F02C 7/20; F05D 2270/62; F05D 2240/90; F01D 25/24; B64C 27/64; B64C 27/625; B64C 27/68; B64C 33/00
See application file for complete search history.

(56) References Cited

U.S. PATENT DOCUMENTS

| | | | | |
|---|---|---|---|---|
| 5,867,979 | A  * | 2/1999 | Newton | F02C 3/113 |
| | | | | 310/90.5 |
| 7,687,928 | B2 * | 3/2010 | Taneja | F01D 15/10 |
| | | | | 290/31 |

(Continued)

FOREIGN PATENT DOCUMENTS

| | | |
|---|---|---|
| EP | 2543589 A1 | 1/2013 |
| EP | 2860412 A1 | 4/2015 |

OTHER PUBLICATIONS

Extended European Search Report for EP Application No. 17167636.4; dated Sep. 21, 2017 (6 pages).

*Primary Examiner* — Steven M Sutherland
*Assistant Examiner* — Thuyhang N Nguyen
(74) *Attorney, Agent, or Firm* — Cantor Colburn LLP

(57) ABSTRACT

An electromechanical system for a gas turbine engine includes a mechanical component located at a first side of a firewall of a gas turbine engine, and an electrical motor located at a second side of the firewall and configured to drive the mechanical component. The electrical motor mechanically connected to the mechanical component through a firewall opening in the firewall, the first side having a higher operating temperature than the second side. An electrical connection extends between the mechanical component and the electrical motor via the same firewall opening.

19 Claims, 5 Drawing Sheets

(51) Int. Cl.
  *B64C 27/68*   (2006.01)
  *B64C 33/00*   (2006.01)
  *H02K 11/20*   (2016.01)
  *F02C 3/04*    (2006.01)
  *F02K 3/06*    (2006.01)
  *H02K 7/00*    (2006.01)
  *F02C 7/25*    (2006.01)

(52) U.S. Cl.
  CPC ...... *F05D 2260/57* (2013.01); *F05D 2270/62* (2013.01)

(56) References Cited

U.S. PATENT DOCUMENTS

| | | | |
|---|---|---|---|
| 9,416,734 B2* | 8/2016 | Thies | F02C 7/32 |
| 2006/0101805 A1 | 5/2006 | Greco | |
| 2008/0098749 A1* | 5/2008 | Liang | F01D 5/088 |
| | | | 60/806 |
| 2008/0238098 A1* | 10/2008 | Becquerelle | H02K 7/116 |
| | | | 290/3 |
| 2009/0165464 A1* | 7/2009 | Gotz | F01D 15/10 |
| | | | 60/802 |
| 2011/0252807 A1* | 10/2011 | Huang | B64D 41/00 |
| | | | 60/788 |
| 2013/0257054 A1* | 10/2013 | Ouellet | F01D 15/10 |
| | | | 290/52 |

* cited by examiner

ELECTRICAL AND MECHANICAL CONNECTIONS THROUGH FIREWALL

BACKGROUND

This disclosure relates to gas turbine engines, and more particularly to the thermal protection of electrical components of gas turbine engines.

Electrical components are by their nature sensitive to temperature and thermal cycling. As a result, it is desired to keep the electrical components relatively cool and within a small temperature range in order to function properly and to extend the useful service life of the electrical components. Many mechanical system components such a pumps, actuators, valves, or the like are driven by electrical motors, and while the mechanical portion of the component may be able to withstand high operating temperatures, the electrical portions of the components, such as a motor, controller and other portions, must be kept relatively cool to maintain their useful service life. In a typical gas turbine engine, a "firewall" is defined that divides a "cold side" of the gas turbine engine where temperatures are typically below 160 degrees Fahrenheit from a "hot side" of the gas turbine engine where operating temperatures are often in the range of about 160 degrees to 600 degrees Fahrenheit or higher. Problems arise when it is desired or necessary to locate a mechanical component with necessary electrical portions such as a motor or a controller on the "hot side" of the firewall.

SUMMARY

In one embodiment, an electromechanical system for a gas turbine engine includes a mechanical component located at a first side of a firewall of a gas turbine engine, and an electrical motor located at a second side of the firewall and configured to drive the mechanical component. The electrical motor mechanically connected to the mechanical component through a firewall opening in the firewall, the first side having a higher operating temperature than the second side. An electrical connection extends between the mechanical component and the electrical motor via the same firewall opening.

Additionally or alternatively, in this or other embodiments the electrical connection includes a first connector portion located at the electrical motor and a second connector portion located at the mechanical component configured such that installation of the electrical motor and the mechanical component at the firewall opening results in engagement of the first connector portion with the second connector portion to complete the electrical connection through the firewall opening.

Additionally or alternatively, in this or other embodiments a drive shaft mechanically connects the electrical motor to the mechanical component.

Additionally or alternatively, in this or other embodiments the electrical connection is configured to communicate data regarding performance and/or operating conditions of the mechanical component between the mechanical component and an electrical controller disposed at the second side of the firewall.

Additionally or alternatively, in this or other embodiments the electrical controller is operably connected to the electrical motor to control operation thereof.

Additionally or alternatively, in this or other embodiments the mechanical component is one of an actuator, a pump or a valve.

Additionally or alternatively, in this or other embodiments the connection is an electrical, optic, electro-magnetic, microwave, radio frequency, inductive or acoustic connection.

Additionally or alternatively, in this or other embodiments a relative installed position of the electrical motor and the mechanical component is adjustable by independent movement of the electrical motor and/or the mechanical component.

Additionally or alternatively, in this or other embodiments the first side has an operating temperature greater than 160 degrees Fahrenheit.

Additionally or alternatively, in this or other embodiments the firewall is positioned axially upstream of a high pressure compressor section of the gas turbine engine, the first side located axially downstream of the firewall.

In another embodiment, a gas turbine engine includes a high pressure compressor, a combustor in operable communication with the high pressure compressor and a firewall located axially upstream of the high pressure compressor. The firewall defines a first side axially downstream of the firewall and a second side axially upstream of the firewall, the second side having a lower operating temperature than the first side. An electromechanical system, includes a mechanical component located at the first side, an electrical motor located at the second side and configured to drive the mechanical component. The electrical motor is mechanically connected to the mechanical component through a firewall opening in the firewall. An electrical connection between the mechanical component and the electrical motor extends via the same firewall opening.

Additionally or alternatively, in this or other embodiments the electrical connection includes a first connector portion located at the electrical motor, and a second connector portion located at the mechanical component configured such that installation of the electrical motor and the mechanical component at the firewall opening results in engagement of the first connector portion with the second connector portion to complete the electrical connection through the firewall opening.

Additionally or alternatively, in this or other embodiments a drive shaft mechanically connects the electrical motor to the mechanical component.

Additionally or alternatively, in this or other embodiments the electrical connection is configured to communicate data regarding performance and/or operating conditions of the mechanical component between the mechanical component and an electrical controller disposed at the second side of the firewall.

Additionally or alternatively, in this or other embodiments the electrical controller is operably connected to the electrical motor to control operation thereof.

Additionally or alternatively, in this or other embodiments the mechanical component is one of an actuator, a pump or a valve.

Additionally or alternatively, in this or other embodiments the connection is an electrical, optic, electro-magnetic, microwave, radio frequency, inductive or acoustic connector.

Additionally or alternatively, in this or other embodiments a relative installed position of the electrical motor and the mechanical component is adjustable by independent movement of the electrical motor and/or the mechanical component.

Additionally or alternatively, in this or other embodiments the first side has an operating temperature greater than 160 degrees Fahrenheit.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
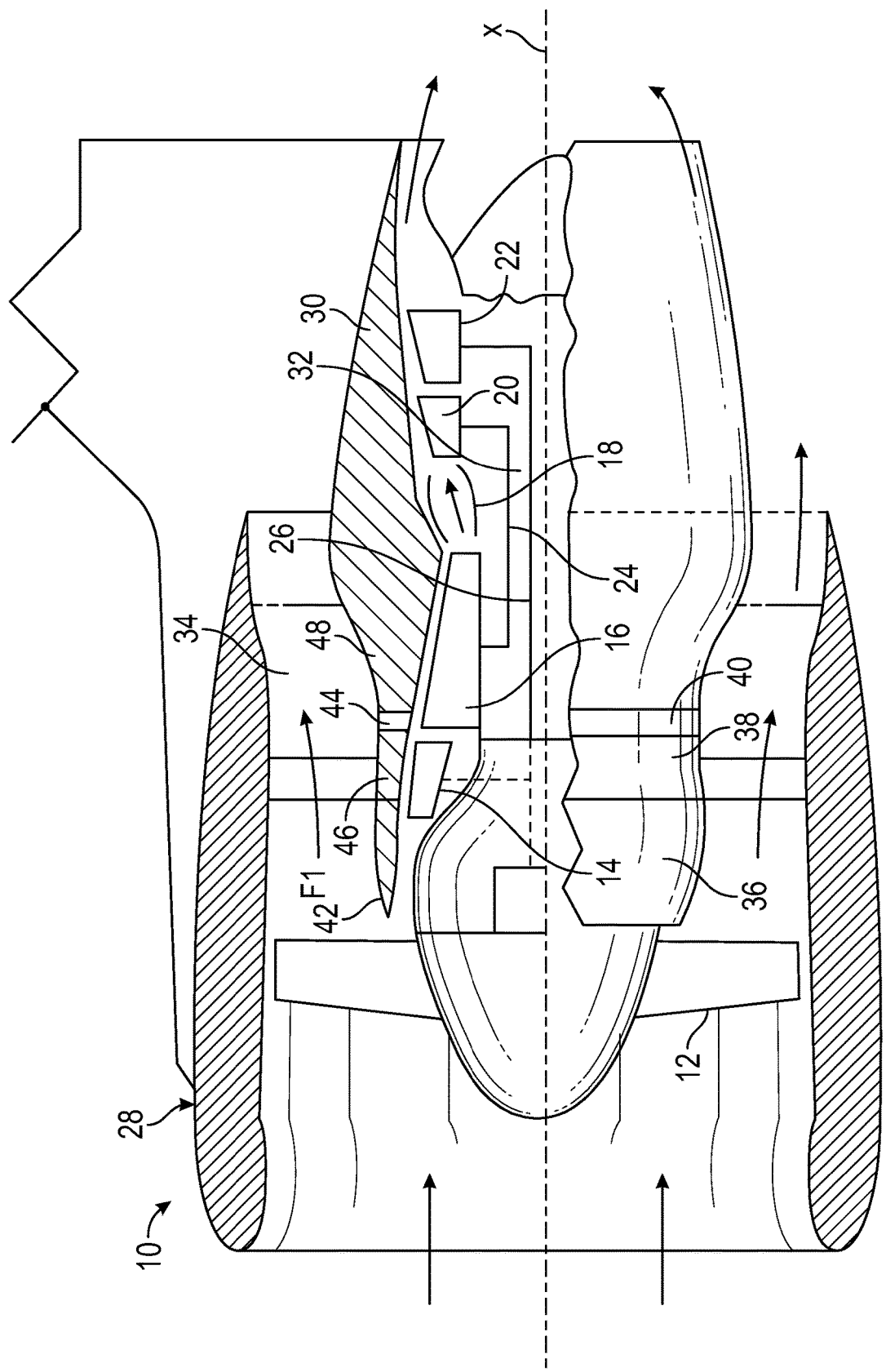
FIG. 1 illustrates a schematic cross-sectional view of an embodiment of a gas turbine engine.

FIG. 1 is a schematic illustration of a gas turbine engine 10. The gas turbine engine generally has includes fan section 12, a low pressure compressor 14, a high pressure compressor 16, a combustor 18, a high pressure turbine 20 and a low pressure turbine 22. The gas turbine engine 10 is circumferentially disposed about an engine centerline X. During operation, air is pulled into the gas turbine engine 10 by the fan section 12, pressurized by the compressors 14, 16, mixed with fuel and burned in the combustor 18. Hot combustion gases generated within the combustor 18 flow through high and low pressure turbines 20, 22, which extract energy from the hot combustion gases.

In a two-spool configuration, the high pressure turbine 20 utilizes the extracted energy from the hot combustion gases to power the high pressure compressor 16 through a high speed shaft 24, and the low pressure turbine 22 utilizes the energy extracted from the hot combustion gases to power the low pressure compressor 14 and the fan section 12 through a low speed shaft 26. The present disclosure, however, is not limited to the two-spool configuration described and may be utilized with other configurations, such as single-spool or three-spool configurations.

Gas turbine engine 10 is in the form of a high bypass ratio turbine engine mounted within a nacelle or fan casing 28 which surrounds an engine casing 30 housing an engine core 32. A significant amount of air pressurized by the fan section 12 bypasses the engine core 32 for the generation of propulsive thrust. The airflow entering the fan section 12 may bypass the engine core 32 via a fan bypass passage 34 extending between the fan casing 28 and the engine casing 30 for receiving and communicating a discharge flow F1. The high bypass flow arrangement provides a significant amount of thrust for powering an aircraft.

The engine casing 30 generally includes an inlet case 36, a low pressure compressor case 38, and an intermediate case 40. The inlet case 36 guides air to the low pressure compressor case 38, and via a splitter 42 also directs air through the fan bypass passage 34.

The gas turbine engine 10 further includes a firewall 44, defined to separate a relatively high temperature portion of the gas turbine engine 10, where operating temperatures may be in the range of 160 degrees to 600 degrees Fahrenheit or higher, from a relatively low temperature portion of the gas turbine engine 10, where operating temperatures are less than about 160 degrees Fahrenheit. It is to be appreciated that the temperatures stated herein are merely exemplary and that in other embodiments, the relatively high temperature portion and/or the relatively low temperature portion may have other temperature profiles. In the embodiment of FIG. 1, the firewall 44 is located between the low pressure compressor 14 and the high pressure compressor 16, separating a hot side 48 of the gas turbine engine 10 where operating temperatures may be in the range of 200 degrees to 600 degrees Fahrenheit or higher, from a cold side 46 of the gas turbine engine 10, where operating temperatures are less than about 160 degrees Fahrenheit. The hot side 48 includes engine areas and components axially downstream of the firewall 44, while the cold side 46 includes engine areas and components axially upstream of the firewall 44.

Figure 2:
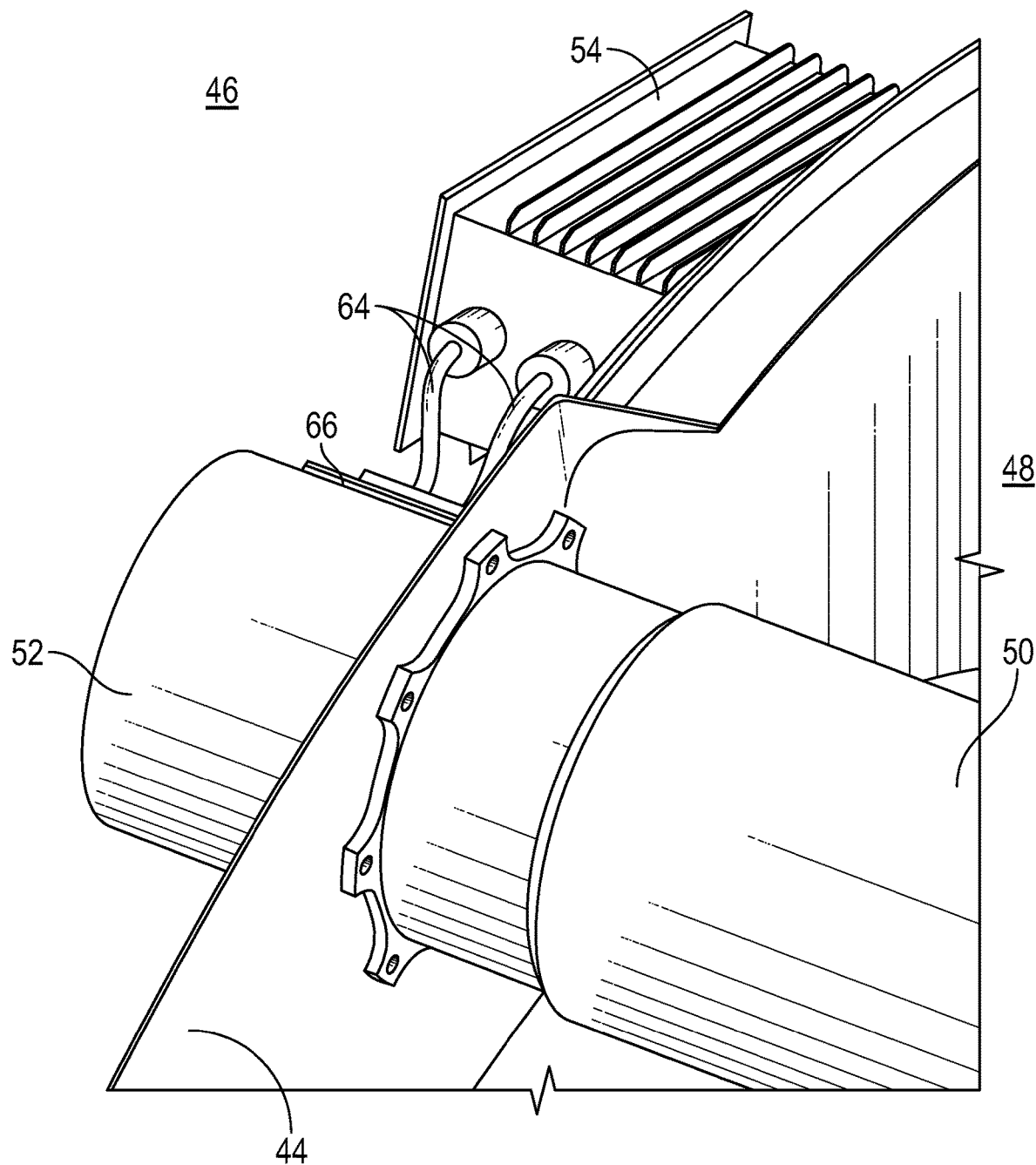
FIG. 2 illustrates a schematic view of an embodiment of a component arrangement at a firewall of a gas turbine engine.

Referring now to FIG. 2, the gas turbine engine 10 includes many mechanical components 50 or devices such as actuators, pumps, valves or the like, and many of these mechanical components 50 utilize electrical components, such as electrical motors 52 and/or electrical controllers 54 to enable or control operation of the mechanical components 50. It is often desired or necessary to locate such mechanical components 50 at the hot side 48 of the firewall 44, but care must be taken to protect the electrical components from the high operating temperatures of the hot side 48. The electrical motor 52 and the mechanical component 50 are mechanically connected through the firewall 44 so the electrical motor 52 can drive the mechanical component 50. Further, an electrical connection between the mechanical component 50 and the electrical controller 54 is provided to allow for the transfer of data relating to mechanical component 50 performance and operating conditions to the electrical controller 54.

Figure 3:
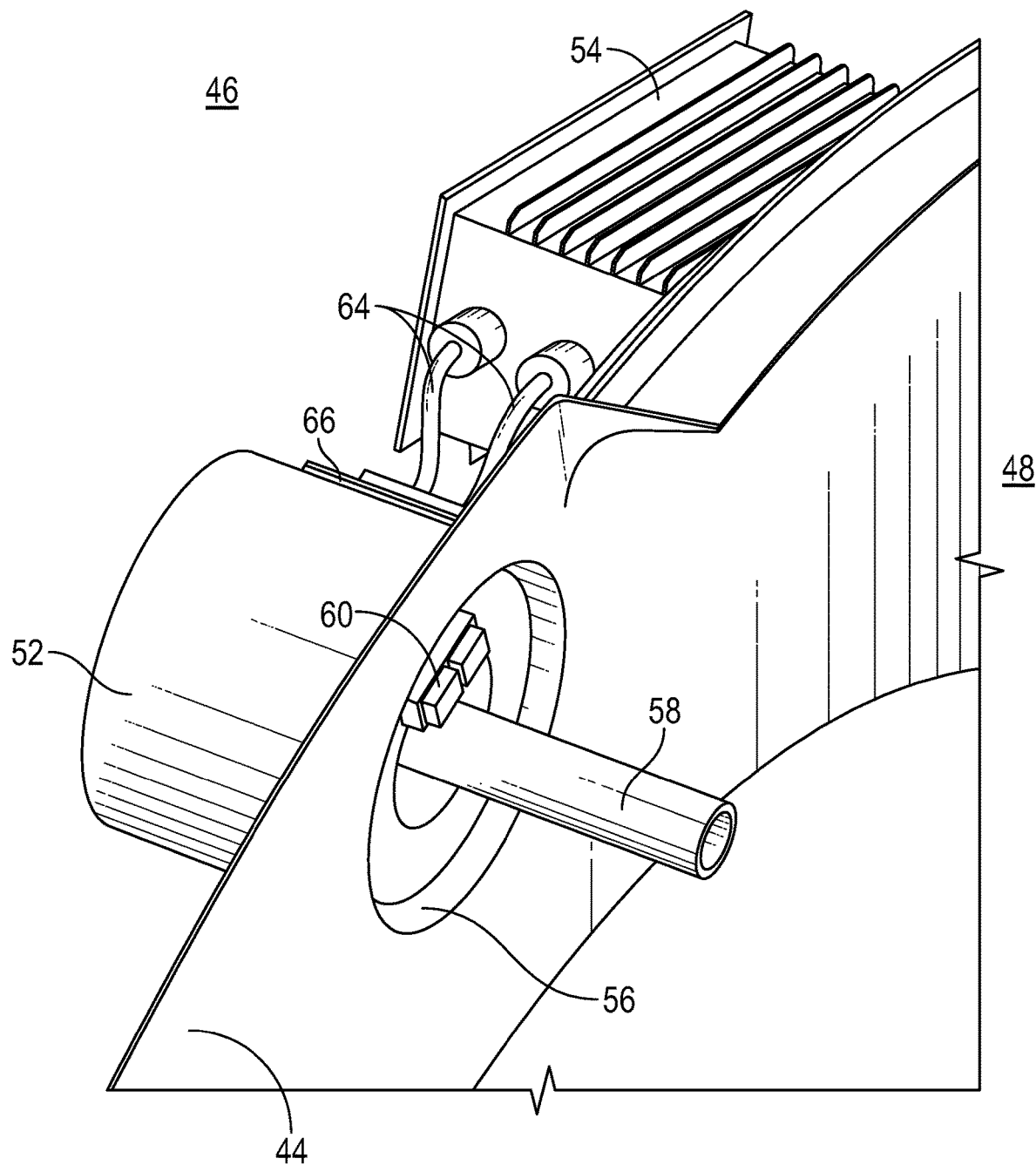
FIG. 3 illustrates a schematic perspective view of an embodiment of a component connection arrangement at a firewall of a gas turbine engine.

Referring now to FIG. 3, to avoid placement of additional openings in the firewall 44, the electrical connection and the mechanical connection is made via the same firewall opening 56 through the firewall 44. The mechanical connection is, for example, a drive shaft 58 extending through the firewall opening 56 to connect the electrical motor 52 to the mechanical component 50 and allow the electrical motor 52 to drive the mechanical component 50. While a drive shaft 58 is shown in FIG. 3, it is to be appreciated that, in other embodiments, other types of couplings may be utilized to connect the electrical motor 52 to the mechanical component 50.

Figure 4:
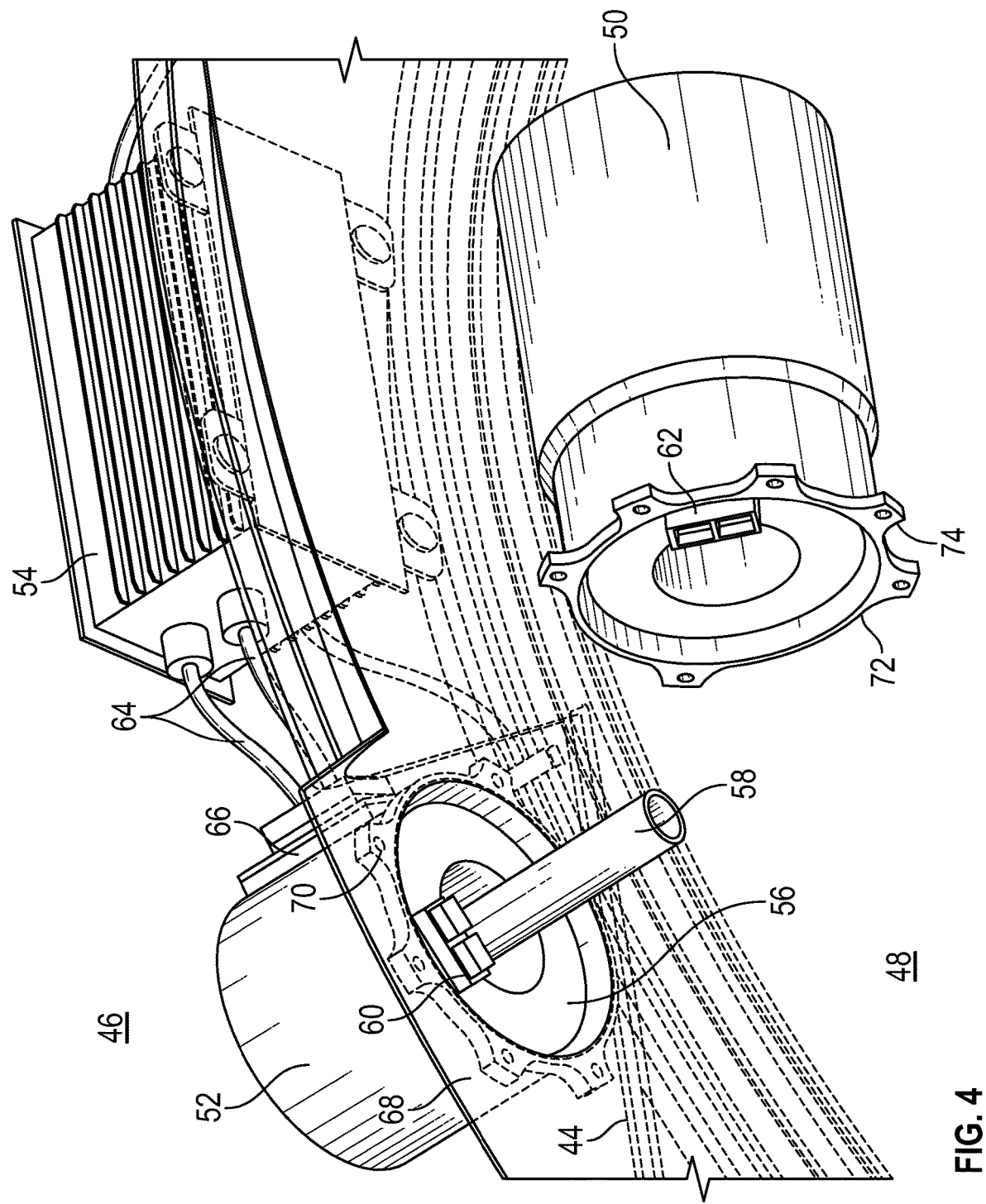
FIG. 4 illustrates another schematic perspective view of an embodiment of a component connection arrangement at a firewall of a gas turbine engine.

The electrical connection is accomplished via a first connector portion 60 located at the electrical motor 52 and a second connector portion 62 (shown in FIG. 4) located at the mechanical component 50. The first connector portion 60 and the second connector portion 62 are configured such that the connector portions 60, 62 align and engage when the electrical motor 52 and the mechanical component 50 are installed to the firewall 44 at the firewall opening 56 thus completing the electrical connection through the firewall 44. In some embodiments, the electrical communication extends from the mechanical component 50, through the electrical connection, and to the electrical controller 54 via controller leads 64 extending from the first connector portion 60 to the electrical controller 54. Further, in some embodiments, data from the mechanical component 50 may be collected at an electronics module 66 located on the cold side 46 on or in, for example, the electrical motor 52. While a conventional electrical connector is illustrated in FIGS. 3 and 4, it is to be appreciated that other connectors such as, for example, optic, electro-magnetic, microwave, radio frequency, inductive or acoustic connectors may be utilized.

Figure 5:
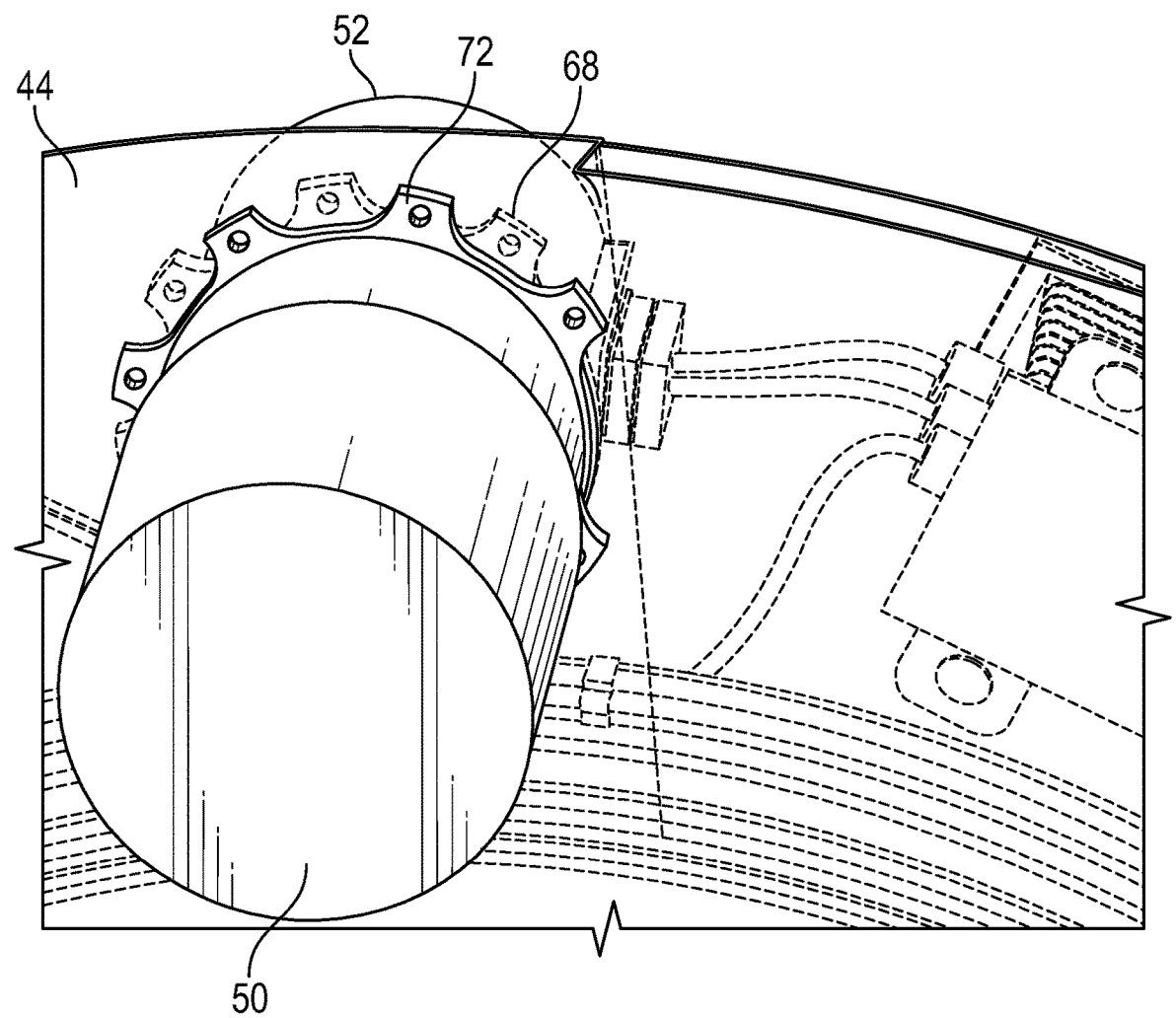
FIG. 5 illustrates yet another schematic perspective view of an embodiment of a component connection arrangement at a firewall of a gas turbine engine.

The mechanical component 50 and the electrical motor 52 are each secured to the firewall 44. In some embodiments, a seal (not shown) is located between the mechanical component 50 and/or the electrical motor 52 and the firewall 44 to prevent leakage of high temperature gases from the hot side 48 through the firewall opening 56. In one embodiment, the electrical motor 52 includes a motor flange 68 with a plurality of motor flange openings 70 through which fasteners (not shown) may be installed to secure the electrical motor 52 to the firewall 44. Similarly, the mechanical component 50 includes a component flange 72 with a plurality of component flange openings 74 though which fasteners (not shown) may be installed to secure the mechanical component 50 to the firewall 44. Further, the motor flange 68 and the component flange 72 may be scalloped between motor flange openings 70 and component flange openings 74, respectively, to allow for independent adjustment of the position of the electrical motor 52 and the mechanical component 50 without interfering with installed fasteners, as schematically shown in FIG. 5. Adjusting the position of the electrical motor 52 and/or the mechanical component 50 ensures alignment between the first connector portion 60 and second connector portion 62 and thus a secure connection. The arrangement of the present disclosure establishes electrical connections across the firewall 44 without utilizing a separate opening through the firewall 44 so that the potential for leakage of high temperature gases across the firewall 44 from the hot side 48 is reduced.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An electromechanical system for a gas turbine engine, comprising:
   a mechanical component disposed at a first side of a firewall of a gas turbine engine, the firewall extending between a core flowpath and a bypass flowpath of the gas turbine engine;
   an electrical motor disposed at a second side of the firewall and configured to drive the mechanical component, the electrical motor mechanically connected to the mechanical component through a firewall opening in the firewall, the first side having a higher operating temperature than the second side; and
   an electrical connection between the mechanical component and the electrical motor via the same firewall opening.

2. The electromechanical system of claim 1, wherein the electrical connection includes:
   a first connector portion disposed at the electrical motor; and
   a second connector portion disposed at the mechanical component configured such that installation of the electrical motor and the mechanical component at the firewall opening results in engagement of the first connector portion with the second connector portion to complete the electrical connection through the firewall opening.

3. The electromechanical system of claim 1, further comprising a drive shaft to mechanically connect the electrical motor to the mechanical component.

4. The electromechanical system of claim 1, wherein the electrical connection is configured to communicate data regarding performance and/or operating conditions of the mechanical component between the mechanical component and an electrical controller disposed at the second side of the firewall.

5. The electromechanical system of claim 4, wherein the electrical controller is operably connected to the electrical motor to control operation thereof.

6. The electromechanical system of claim 1, wherein the mechanical component is one of an actuator, a pump or a valve.

7. The electromechanical system of claim 1, further comprising one or more of an electrical, optic, electromagnetic, microwave, radio frequency, inductive, or acoustic connection through the same firewall opening.

8. The electromechanical system of claim 1, wherein a relative installed position of the electrical motor and the mechanical component is adjustable by independent movement of the electrical motor and/or the mechanical component.

9. The electromechanical system of claim 1, wherein the first side has an operating temperature greater than 160 degrees Fahrenheit.

10. The electromechanical system of claim 1, wherein the firewall is disposed axially upstream of a high pressure compressor section of the gas turbine engine, the first side disposed axially downstream of the firewall.

11. A gas turbine engine comprising:
    a high pressure compressor;
    a combustor in operable communication with the high pressure compressor;
    a firewall extending between a core flowpath and a bypass flowpath of the gas turbine engine, the firewall defining a first side axially downstream of the firewall and a second side axially upstream of the firewall, the second side having a lower operating temperature than the first side; and
    an electromechanical system, including:
       a mechanical component disposed at the first side;
       an electrical motor disposed at the second side and configured to drive the mechanical component, the electrical motor mechanically connected to the mechanical component through a firewall opening in the firewall; and
       an electrical connection between the mechanical component and the electrical motor via the same firewall opening.

12. The gas turbine engine of claim 11, wherein the electrical connection includes:
    a first connector portion disposed at the electrical motor; and
    a second connector portion disposed at the mechanical component configured such that installation of the electrical motor and the mechanical component at the firewall opening results in engagement of the first connector portion with the second connector portion to complete the electrical connection through the firewall opening.

13. The gas turbine engine of claim 11, further comprising a drive shaft to mechanically connect the electrical motor to the mechanical component.

14. The gas turbine engine of claim 11, wherein the electrical connection is configured to communicate data regarding performance and/or operating conditions of the mechanical component between the mechanical component and an electrical controller disposed at the second side of the firewall.

15. The gas turbine engine of claim 14, wherein the electrical controller is operably connected to the electrical motor to control operation thereof.

16. The gas turbine engine of claim 11, wherein the mechanical component is one of an actuator, a pump or a valve.

17. The gas turbine engine of claim 11, further comprising one or more of an electrical, optic, electro-magnetic, microwave, radio frequency, inductive or acoustic connection through the same firewall opening.

18. The gas turbine engine of claim 11, wherein a relative installed position of the electrical motor and the mechanical component is adjustable by independent movement of the electrical motor and/or the mechanical component.

19. The gas turbine engine of claim 11, wherein the first side has an operating temperature greater than 160 degrees Fahrenheit.

* * * * *